(12) United States Patent  
Ooi et al.

(10) Patent No.: US 6,661,614 B2
(45) Date of Patent: Dec. 9, 2003

(54) MAGNETLESS ACTUATOR FOR DISC DRIVE

(75) Inventors: Tak Koon Ooi, Singapore (SG); Kevin Arthur Gomez, Singapore (SG); Xiong Liu, Singapore (SG); Kwee Teck Say, Singapore (SG); Choon Kiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 171 days.

(21) Appl. No.: 09/919,547

(22) Filed: Jul. 31, 2001

(65) Prior Publication Data

US 2002/0036868 A1 Mar. 28, 2002

Related U.S. Application Data

(60) Provisional application No. 60/235,612, filed on Sep. 27, 2000.

(51) Int. Cl.[7] ................................................. G11B 5/55
(52) U.S. Cl. .................................................. 360/264.7
(58) Field of Search .................... 360/264.3, 264.7–265

(56) References Cited

U.S. PATENT DOCUMENTS

| 4,048,531 | A | | 9/1977 | Buess et al. |
| 4,228,387 | A | | 10/1980 | Brown |
| 4,286,180 | A | | 8/1981 | Langley |
| 4,346,416 | A | | 8/1982 | Riggle et al. |
| 4,524,400 | A | | 6/1985 | Cantwell |
| 4,728,830 | A | | 3/1988 | Gamble |
| 5,093,596 | A | | 3/1992 | Hammer |
| 5,257,151 | A | * | 10/1993 | Cooper .................... 360/98.07 |
| 5,706,150 | A | | 1/1998 | Williams |
| 5,907,455 | A | | 5/1999 | Dunfield |

* cited by examiner

Primary Examiner—A. J. Heinz
(74) Attorney, Agent, or Firm—Derek J. Berger

(57) ABSTRACT

A magnetless rotary actuator for carrying one or more read/write heads across a data bearing medium, the rotary actuator comprising: a stator including a plurality of independently controllable flux generating means for directing flux between the stator and a rotor; the rotor including means for presenting discrete regions of low magnetic reluctance to the controllable flux generating means; torque coupling means for transmitting operative torque from the rotor to the read/write head; and pivot means for supporting the torque coupling means.

20 Claims, 2 Drawing Sheets

MAGNETLESS ACTUATOR FOR DISC DRIVE

RELATED APPLICATIONS

The present application claims benefit of the U.S. provisional patent application No. 60/235,612, filed Sep. 27, 2000.

FIELD OF THE INVENTION

The present invention relates to data storage devices. More particularly, it relates to movement of rotary actuators for disc drives.

BACKGROUND OF THE INVENTION

Typically, a disc drive includes an actuator arm with a magnetic read/write head for writing and reading data with respect to a track of a rotating disc. The actuator arm is arranged to turn on a pivot. The read/write head is located at one end portion of the actuator arm. The opposite end of the actuator arm generally acts as the rotor of an electric motor such as a voice coil motor.

Upon current being driven through the voice coil, the actuator arm rotates about the pivot thereby causing the magnetic head to move across the surface of the disc until it is positioned above a desired track in order that data may be written to or read from the track in question.

A voice coil is generally comprised of numerous components including a permanent magnet, coil, top pole, bottom pole, metal injection molding latch and latch bumper. The voice coil is typically assembled by means of adhesive and screws used to couple the components together. The number of components and the high degree of accuracy with which they must be positioned in order to properly assemble them together adds considerably to the overall expense of the finished product. Furthermore, a lengthy baking step is included in the production process to cure various epoxies or other adhesives used to assemble the prior art voice coil actuators. The baking step is undesirable as it is time-consuming, is a high consumer of energy and generates pollutant gases.

Attempts have been made to effect actuator movement through other arrangements so as to eliminate some of the disadvantages associated with conventional voice coil motors. For example, some have used a stator having a permanent magnet at an actuator pivot point, while magnetic coils on the actuator interact with the stator so as to move the actuator. Others have mounted magnets on a rotor so as to cooperate with a coil wound on an arcuate stator core at the actuator pivot.

These actuators have problems of their own. Because an air gap is required between the rotor and stator, and because the stator serves as a pivot point for the actuator, they typically impart undesirable pitch and roll torques to the actuator arm, which undermine the performance of the finished disc drive or require special design features to counteract them.

What the prior art has been lacking is an actuator drive which eliminates the problems associated with conventional voice coil motors while maintaining the rotational stability of these arrangements.

SUMMARY OF THE INVENTION

A preferred embodiment of the present invention is directed to a magnetless rotary actuator for carrying one or more read/write heads across a data bearing medium. The rotary actuator includes a stator and a rotor. The stator includes a plurality of independently controllable flux generating elements for directing flux towards the rotor, and the rotor includes discrete regions of low magnetic reluctance to interact with the flux generating elements. The actuator supports one or more read/write heads over the surface of a disc, and is pivotally mounted, so as to allow transmission of operative torque from the rotor to the read/write head(s).

These and various other features as well as advantages which characterize the present invention will be apparent upon reading of the following detailed description and review of the associated drawings.

DETAILED DESCRIPTION

Figure 1:
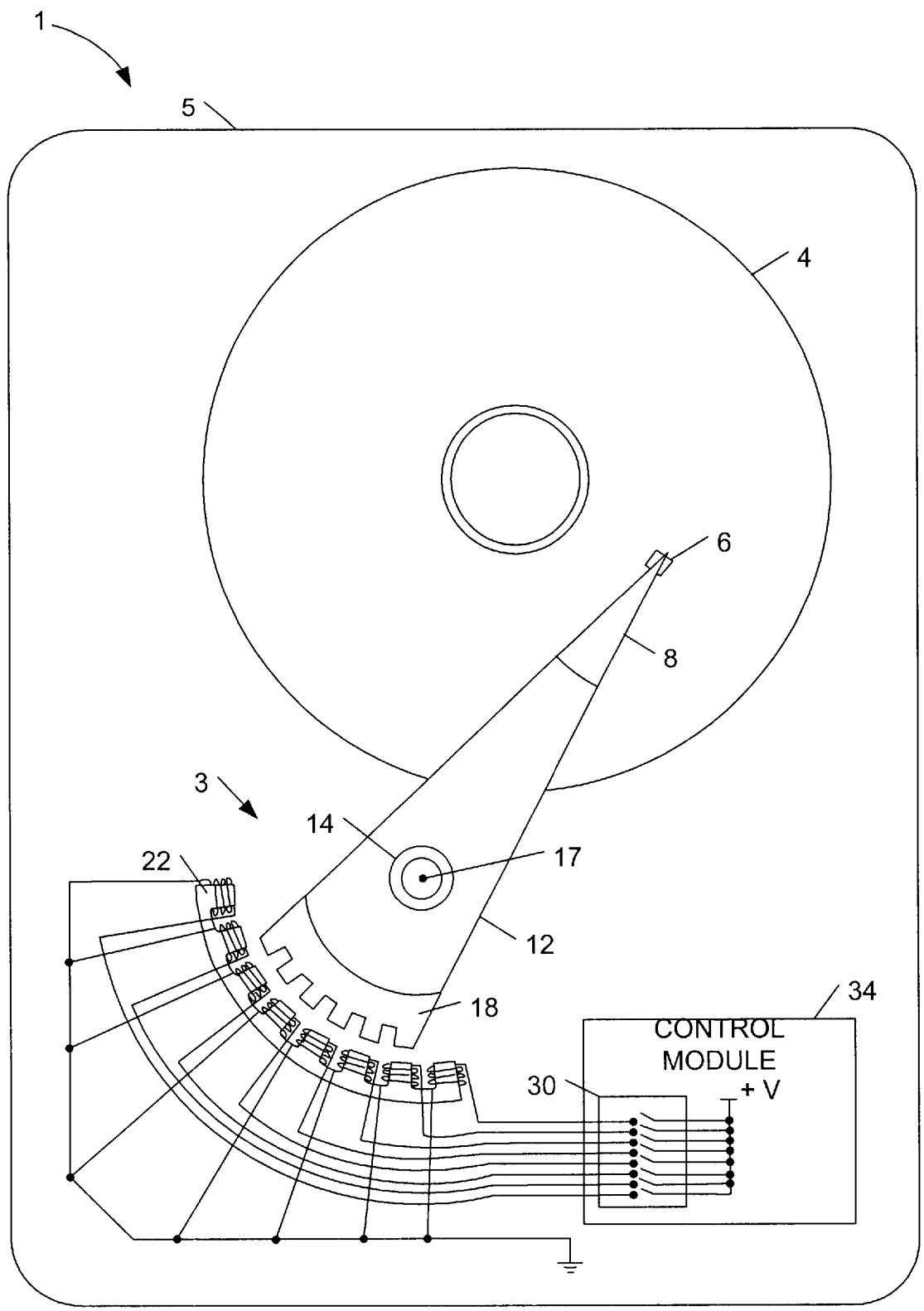
FIG. 1 is a simplified and somewhat schematic top view of a disc drive incorporating an actuator according to an embodiment of the present invention.

FIG. 1 is a simplified, and somewhat schematic, top view of a disc drive incorporating an actuator according to a preferred embodiment of the present invention. The disc drive 1 comprises an actuator 3 and a rotatable disc 4, both mounted on a base 5. The actuator 3 includes an arm 12 rotatably mounted to the base 5 by means of pivot assembly 14. At one end of actuator arm 12 there is a suspension assembly 8 which supports a read/write head 6 for reading data encoded in circular tracks on disc 4. The suspension assembly 8 is made of stainless steel or some other material that does not affect the read/write head 6.

The actuator arm 12 is continuous with, or coupled to, a rotor 18. The rotor 18 is formed of a material that is magnetically permeable but preferably not readily magnetized. In one embodiment, where the actuator 3 includes a plurality of arms 12 for accessing a plurality of disc surfaces, the rotor 18 is preferably formed of a piece of stamped hard iron. In this embodiment, the actuator arms 12 are preferably formed of a lightweight material such as aluminum. In another embodiment, where the actuator 3 includes only a single arm 12 for accessing a single disc 4, the rotor 18 and actuator arm 12 may be formed from a single piece of hard iron.

The actuator arm 12 acts as a torque coupler for transmitting operative torque from the rotor 18 to the suspension assembly 8 and read/write head 6. The pivot assembly 14 may take the form of any conventional pivot such as a bearing cartridge (not shown) which is well-known for use in disc drives. The pivot assembly 14 is arranged to allow pivoting of the actuator 3 about a pivot point 17 that preferably coincides with the center of gravity of the actuator 3.

Figure 2:
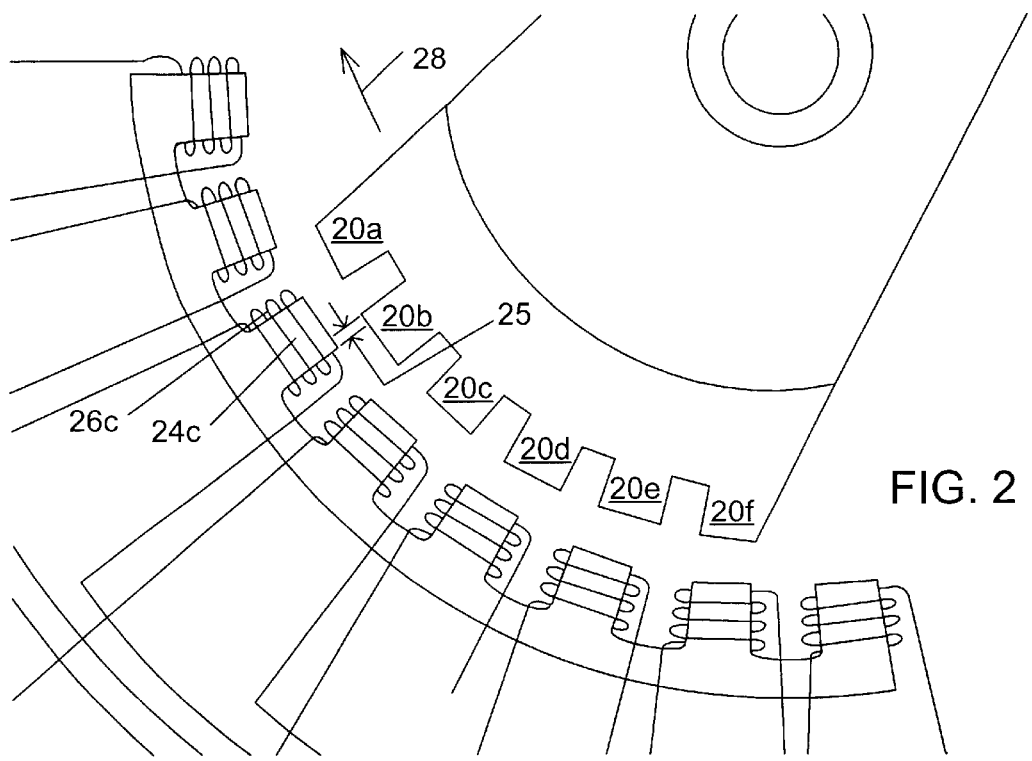
FIG. 2 is an enlargement of a portion of FIG. 1.

Projecting along the outer periphery of the rotor 18 away from the pivot point 14 are rotor teeth 20A, . . . , 20F best seen in FIG. 2. Six teeth 20 are shown in the illustrated embodiment, though it should be understood that varying numbers of teeth 20 may be provided without departing from the spirit of the invention. As will be explained below, in operation the rotor teeth 20 present discrete regions of low magnetic reluctance to stator 22 relative to air gap portions which separate the rotor teeth 20 and have much higher reluctance than the rotor teeth 20.

Stator 22 is formed of a material that is easily magnetisable, such as soft iron. Stator core 22 is of a generally arcuate shape having an inner periphery with teeth 24A, . . . , 24H protruding inwards towards the pivot point 14 as shown. Eight teeth 24 are shown in the illustrated embodiment, though it should be understood that varying numbers of teeth 24 may be provided without departing from the spirit of the invention.

Both the inner periphery of the stator 22 and the outer periphery of rotor 18 are generally arcuate and with common centers at pivot point 17. Around each of the stator teeth 24 is wound a coil 26A, . . . , 26H. For ease of assembly, the coils 26 may be wound on plastic bobbins, not shown, which fit over the stator teeth 24.

With reference to FIG. 1, each of the coils 26 may be energized by closing a corresponding pole of eight-way switch 30, thereby placing a selected coil 26 between a current limited voltage source V and ground. Switch 30 is controlled by control module 34. Switch 30 and control module 34 are typically implemented by means of integrated circuit semiconductor device logic.

As will be explained, the stator teeth 24 and coils 26 act as independently controlled flux generating elements for directing flux across the gap between stator 22 and rotor 18.

Control module 34 is arranged to control switch 30 in order to energize the coils in a manner that causes the actuator arm 12 to pivot so that read/write head 6 may be maintained on a desired track, or caused to seek out a particular track of disc 4.

The operation of the actuator 3 will now be explained with reference to FIGS. 2 and 3.

In order to make rotor 18 move in the direction indicated by arrow 28, coil 26C is energized by closing a corresponding pole of switch 30. As will be noted in FIG. 2, rotor tooth 20B is initially at a position overlapping stator tooth 24C by about 30% of its width as indicated by arrows 25. Upon energizing coil 26C a current flows through coil 24C which induces magnetic flux to flow across the air gap between stator tooth 24C and rotor tooth 20B forming a magnetic flux circuit, the return path being back across the air gap through neighboring rotor and stator teeth. In response to initiation of the magnetic flux, a directed force is generated that tends to move the rotor 18 to a position that minimizes the variable part of the flux path, in the presently described case, the air gap, thus causing a rotational torque that pivots the rotor 18 to the position shown in FIG. 3.

Figure 3:
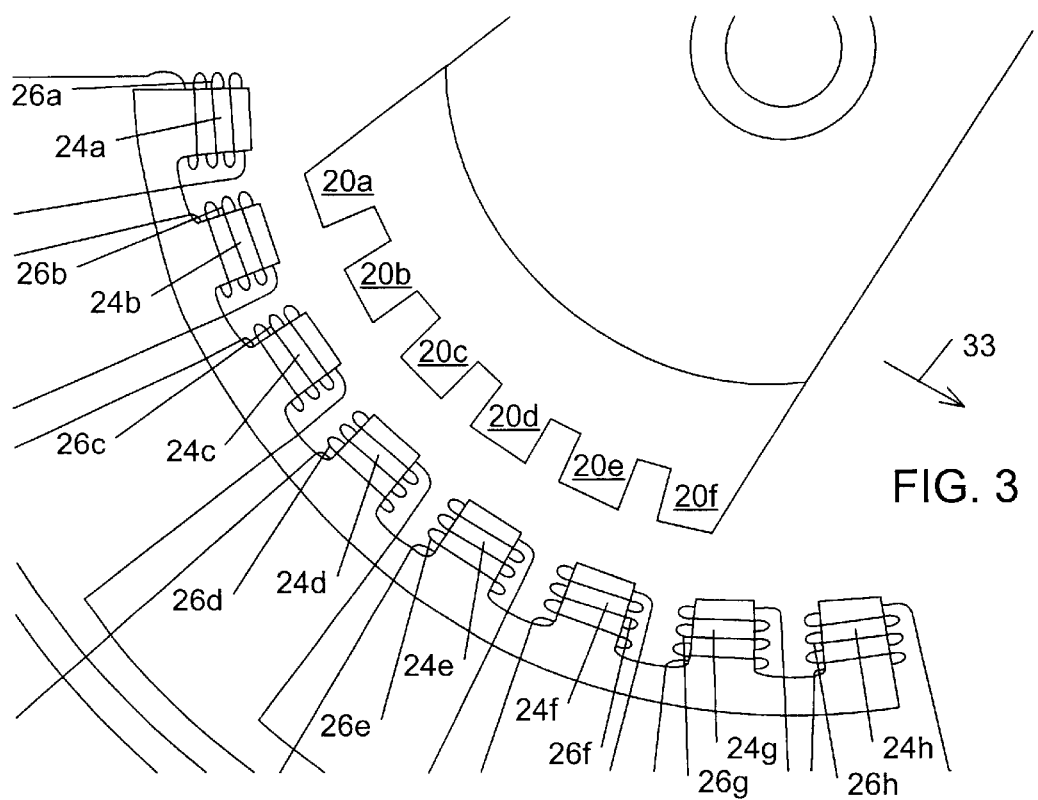
FIG. 3 is a view similar to that of FIG. 2 wherein the rotor has pivoted clockwise.

As shown in FIG. 3, the rotor comes to rest at a position where rotor tooth 20B is maximally aligned with the energized stator tooth 24C thereby minimizing the reluctance of the air gap adjacent the energized coil.

In the event that it is now necessary to rotate the stator counter-clockwise in the direction shown by arrow 33 then coil 26C is de-energized whereas coil 26F is energized generating magnetic flux in response to which the rotor pivots tooth 20E into maximal alignment with stator tooth 20F.

For optimal operation the starting overlap of a rotor tooth 20 and opposing stator tooth 24 should be in the range of 25–33% of the width of the teeth.

It will be realized that the angular separation of the rotor teeth 20 must be different to that of the stator teeth 24 so that the situation where all the stator teeth 24 are maximally aligned with corresponding rotor teeth 20 does not occur. In the preferred embodiment, the angular separation and spacing of the rotor teeth 20 is about 36 degrees and that of the stator teeth 24 is about 24 degrees.

Alternatively, preferred embodiments of the present invention may be described in terms of a magnetless rotary actuator 3 that is configured for carrying one or more read/write heads 6 across a data bearing medium 4. The magnetless rotary actuator 3 includes a stator 22 having a number of stator teeth 24 projecting toward a pivot point 17, with each of the stator teeth 20 having wound thereon an independently energizable coil 26. The magnetless rotary actuator 3 further includes a rotor 18 having a number of rotor teeth 20 projecting away from the pivot point 17 towards the stator teeth 24 thereby defining a gap therebetween. Forming part of the magnetless rotary actuator 3 is an actuator arm 12 that is pivotable about the pivot point 17. The actuator arm 12 is coupled to the rotor 18 at a first end and to the read/write head 6 at a second opposite end.

Optionally, the actuator arm 12 is formed integrally with the rotor 18. The actuator arm 12 and the rotor 18 may be formed from a single piece of hard iron. There may be a pivot assembly 14 supporting the actuator arm 12 at the center of gravity of an actuator arm assembly that includes the actuator arm 12 and the rotor 18. The read/write head 6 may be coupled to the actuator arm 12 by means of a suspension assembly 8. In a preferred embodiment, the magnetless rotary actuator 3 is incorporated into a memory device for storing data readable by a computational device. The data bearing medium 4 may be a magnetic medium where the memory device includes a disc drive. The disc drive 1 may further include controller means 34 operative to separately energize the coils 26.

As will be realized by those skilled in the art, embodiments of the invention other than the preferred embodiment described in detail herein are possible. Accordingly the following claims are not to be read as limited by the preferred embodiment.

What is claimed is:

1. A magnetless rotary actuator for carrying one or more read/write heads across a data bearing medium, the rotary actuator comprising:
   a stator including a plurality of independently controllable flux generating elements;
   a rotor including discrete regions of low magnetic reluctance for interacting with the flux generating elements;
   an actuator arm for transmitting operative torque from the rotor to the read/write head; and
   a pivot assembly for rotatably supporting the actuator.

2. The actuator of claim 1, in which each flux generating element comprises a separately energizable coil.

3. The actuator of claim 2, in which each flux generating element further comprises a stator tooth extending toward the rotor, each coil being wrapped around a corresponding stator tooth.

4. The actuator of claim 1, in which each discrete region of low magnetic reluctance comprises a rotor tooth projecting towards the stator.

5. The actuator of claim 1, in which the actuator arm and the rotor are formed from a single, continuous piece of material.

6. The actuator of claim 1, in which the rotor and actuator arm are formed of a single piece of hard iron.

7. The rotary actuator of claim 1, in which the pivot assembly supports the actuator at a center of gravity of the actuator.

8. A disc drive, comprising:
   a base; and
   the rotary actuator of claim 1 mounted to the base.

9. The disc drive of claim 8, further comprising:

a controller operative to separately energize each of the flux generating elements.

10. A disc drive, comprising:

a base;

a disc rotatably mounted to the base;

a rotary actuator for carrying a read/write head over a surface of the disc, the actuator being mounted to the base for rotation about a pivot point, the actuator comprising:
- a stator having a number of stator teeth projecting toward the pivot point, each of the teeth having wound thereon an independently energizable coil;
- a rotor including a number of rotor teeth projecting away from the pivot point towards the stator teeth thereby defining a gap therebetween; and
- an elongate actuator arm pivotable about the pivot point, the arm being coupled to the rotor at a first end and configured to be coupled to the read/write head at a second opposite end.

11. The disc drive of claim 10, in which the actuator arm and the rotor are formed from a single, continuous piece of material.

12. The disc drive of claim 10, in which the actuator arm and the rotor are formed from a single piece of hard iron.

13. The disc drive of claim 10, further comprising:

controller circuitry coupled to each coil.

14. The disc drive of claim 10, in which the pivot point is located at a center of gravity of the actuator.

15. The disc drive of claim 10, further comprising:

a suspension assembly coupled to the actuator; and a read/write head coupled to the suspension assembly.

16. A disc drive comprising:

a base;

an actuator rotatably mounted to the base about a pivot point; and means for moving the actuator about the pivot point.

17. The disc drive of claim 16, the moving means comprising:

a stator mounted to the actuator.

18. The disc drive of claim 16, the moving means comprising:

a magnetically permeable element protruding away from the pivot point.

19. The disc drive of claim 16, the moving means comprising:

a flux generating element protruding toward the pivot point.

20. The disc drive of claim 16, the moving means comprising:

a plurality of independently energizable flux generating elements.

* * * * *